(12) United States Patent
Wittkopp et al.

(10) Patent No.: US 9,097,323 B2
(45) Date of Patent: Aug. 4, 2015

(54) AUTOMATED ELECTRIC MANUAL TRANSMISSION

(71) Applicant: GM GLOBAL TECHNOLOGY OPERATIONS LLC, Detroit, MI (US)

(72) Inventors: Scott H. Wittkopp, Ypsilanti, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 13/676,157

(22) Filed: Nov. 14, 2012

(65) Prior Publication Data

US 2014/0135162 A1 May 15, 2014

(51) Int. Cl.
*F16H 3/44* (2006.01)
*F16H 3/72* (2006.01)
*B60K 6/48* (2007.10)
*B60K 6/365* (2007.10)
*B60K 6/547* (2007.10)

(52) U.S. Cl.
CPC ............... *F16H 3/725* (2013.01); *B60K 6/365* (2013.01); *B60K 6/48* (2013.01); *B60K 6/547* (2013.01)

(58) Field of Classification Search
USPC ............................................. 475/5, 302, 275
See application file for complete search history.

(56) References Cited

U.S. PATENT DOCUMENTS

| 7,347,797 | B2* | 3/2008 | Sowul et al. ................. 475/5 |
| 7,427,252 | B2* | 9/2008 | Holmes ....................... 475/5 |
| 2007/0129203 | A1* | 6/2007 | Raghavan et al. ............ 475/275 |
| 2008/0064550 | A1* | 3/2008 | Holmes ....................... 475/5 |
| 2008/0103002 | A1* | 5/2008 | Holmes ....................... 475/5 |
| 2010/0210388 | A1* | 8/2010 | Grochowski et al. ........ 475/5 |
| 2011/0021300 | A1* | 1/2011 | Grochowski et al. ........ 475/5 |
| 2012/0252626 | A1* | 10/2012 | Robinette ................... 475/284 |
| 2013/0196805 | A1* | 8/2013 | Phillips ...................... 475/5 |

FOREIGN PATENT DOCUMENTS

DE 102007022774 A1 * 11/2008

* cited by examiner

*Primary Examiner* — Ramya Burgess
*Assistant Examiner* — Lillian Nguyen
(74) *Attorney, Agent, or Firm* — Quinn Law Group, PLLC

(57) ABSTRACT

An automated electric manual transmission (EMT) has an input member, an output member, and at least one shaft. The input member and the at least one shaft are rotatable about a first axis of rotation. A countershaft is substantially parallel with the at least one shaft and is rotatable about a second axis of rotation. The output member is operatively connected to rotate with the countershaft. A transmission controller controls engagement of a plurality of torque-transmitting mechanisms to selectively establish different gear ratios from the at least one shaft to the transfer shaft through pairs of intermeshing gears. An electric motor and a planetary gear set are concentric with the first axis of rotation. The electric motor can provide torque to a member of the planetary gear set.

15 Claims, 6 Drawing Sheets

AUTOMATED ELECTRIC MANUAL TRANSMISSION

TECHNICAL FIELD

The present teachings generally include a transmission with torque-transmitting mechanisms such as synchronizers to engage different gear pairs to establish different gear ratios.

BACKGROUND

Automated manual transmissions use a computer to control the shifting of gears rather than a driver-operated clutch. Unlike automatic transmissions, an automated manual transmission usually has a clutched connection to the engine, rather than a torque-converter connection. Because a driver does not control the shifting of the transmission, the temporary disruption of powerflow from the engine through the transmission during a shift can be more surprising than in a manual transmission.

SUMMARY

An automated electric manual transmission (EMT) has an input member, an output member, and at least one shaft. The input member and the at least one shaft are rotatable about a first axis of rotation. A countershaft is arranged substantially parallel with the at least one shaft and is rotatable about a second axis of rotation. The output member is operatively connected to rotate with the countershaft. The EMT has a plurality of selectively engageable torque-transmitting mechanisms and at least three pairs of intermeshing gears. Each of the pairs of intermeshing gears is operable to provide a different gear ratio between the at least one shaft and the countershaft. At least some of the pairs of intermeshing gears require a respective one of the torque-transmitting mechanisms to be engaged with one of the gears of the pairs of intermeshing gears in order for torque to be transferred from the at least one shaft to the countershaft. A transmission controller is operable to control engagement of the torque-transmitting mechanisms to selectively establish at least some of the gear ratios. An electric motor is concentric with the first axis of rotation. A planetary gear set is also concentric with the first axis of rotation and has a first member, a second member and a third member. The first member is operatively connectable to the countershaft through at least one of the pairs of intermeshing gears. A first clutch is selectively engageable to operatively connect the input member with the first member. The second member is connected to rotate commonly with the electric motor.

The EMT is a relatively low cost, easily packagable transmission. As explained herein, the electric motor can be used for torque assist, and, in one embodiment, for torque fill during a gear ratio shift.

The above features and advantages and other features and advantages of the present teachings are readily apparent from the following detailed description of the best modes for carrying out the present teachings when taken in connection with the accompanying drawings.

DETAILED DESCRIPTION

Figure 1:
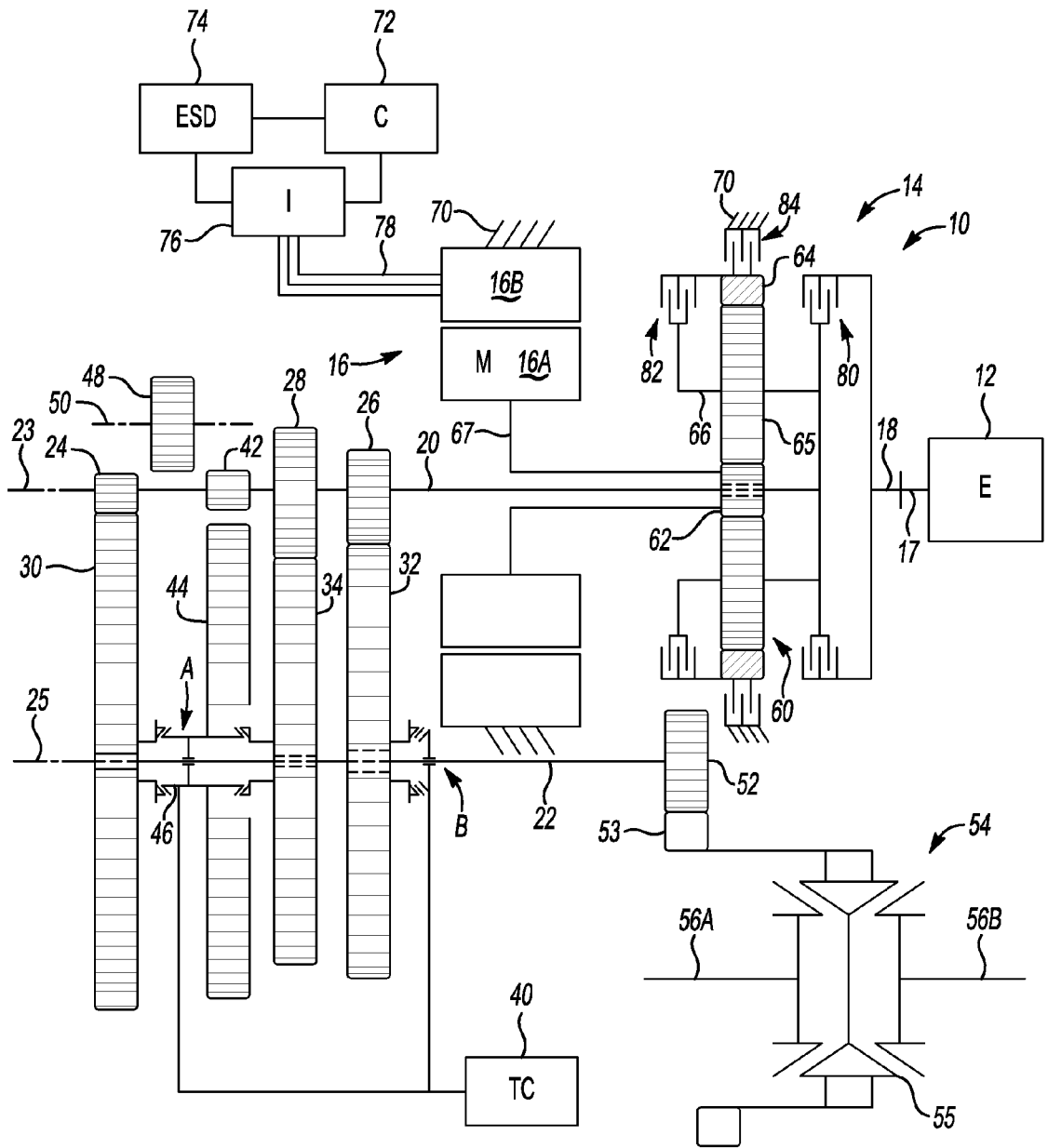
FIG. 1 is a schematic side view illustration of a first embodiment of a hybrid powertrain with a first embodiment on an electric manual transmission (EMT).

Referring to the drawings, wherein like reference numbers are used to identify like or identical components in the various views, FIG. 1 shows a hybrid powertrain 10. The hybrid powertrain 10 includes an engine (E) 12 and an electric manual transmission (EMT) 14. The EMT 14 is arranged similarly to a manual transmission, but gear shifts are automated under the control of an electronic controller 40, and an electric motor (M) 16 is available as an additional power source. Accordingly, although the transmission 14 is not a manual transmission, it is referred to as an automated electric manual transmission.

The engine 12 may be an internal combustion engine or any other type of prime mover. The engine 12 has a crankshaft 17 connected to drive an input member 18 of the EMT 14. A plurality of intermeshing gear pairs are arranged on a transfer shaft 20 and a parallel countershaft 22. Specifically, gears 24, 26 and 28 are mounted on and rotate with the transfer shaft 20. The transfer shaft 20 and the input member 18 are coaxial and both rotate about a first axis of rotation 23. Gears 30, 32 and 34 are mounted on and rotate about the countershaft 22 but are not connected for rotation with the countershaft 22. The countershaft 22 rotates about a second axis of rotation 25. Gear 24 meshes with gear 30 to form a first gear pair that provides a first gear ratio between the countershaft 22 and the transfer shaft 20. Gear 26 meshes with gear 32 to form a second gear pair that provides a second gear ratio between the countershaft 22 and the transfer shaft 20. Gear 28 meshes with gear 34 to form a third gear pair that provides a third gear ratio between the countershaft 22 and the transfer shaft 20.

A double-sided synchronizer A and a single-sided synchronizer B are mounted on and rotate with the countershaft 22. The synchronizers A and B are also referred to herein as torque-transmitting mechanisms. Although synchronizers are used in the embodiments shown, other types of suitable torque-transmitting mechanisms may be used. The synchronizers A and B are controlled by a transmission controller (TC) 40 to be selectively engaged with the gears 30, 32 or 34. Specifically, synchronizer A can be shifted to the left in FIG. 1 by the TC 40 to engage gear 30 so that gear 30 is operatively connected with the countershaft 22 to rotate at the same speed as the countershaft 22 to establish a first gear ratio. Synchronizer A can be shifted to the right in FIG. 1 by the TC 40 to engage gear 34 so that gear 34 is operatively connected with the countershaft 22 to rotate at the same speed as the countershaft 22 to establish a third gear ratio. Synchronizer B can be shifted to the left in FIG. 1 by the TC 40 to engage 32 so that gear 32 is operatively connected with the countershaft 22 to rotate at the same speed as the countershaft 22 to establish a second gear ratio with a numerical value between the first and third gear ratios.

The transfer shaft 20 also supports a first gear 42 that rotates with the transfer shaft 20 about the first axis of rotation 23. The synchronizer A supports a second gear 44 on a movable sleeve 46 of the synchronizer A. The second gear 44 is not configured to mesh with the first gear 42, but is aligned with the first gear 42 when the synchronizer A is in a neutral position, not engaged with either gear 30 or gear 34. An idler gear 48 is supported by bearings on a transmission casing (not shown) to rotate about a third axis of rotation 50. The idler gear 48 is actually arranged in a triangular formation with the gears 42, 44 so that the axis of rotation 50 and the axes of rotation 23, 25 form a triangle. The idler gear 48 can be shifted by the transmission controller TC 40 to mesh with both the gears 42, 44. Because of the idler gear 48, the direction of rotation of the countershaft 22 is the same as the direction of rotation of the transfer shaft 20. The gear pairs 24, 30; 26, 32; and 28, 34 are arranged to provide a forward rotation at a gear 52 that rotates with the countershaft 22 and serves as an output member of the transmission 14. Gear 52 is also referred to as output member 52. The gear train 42, 44, 48 provides a reverse rotation at gear 52. A final drive 54 having a transfer gear 53 and a differential 55 is driven by the output member 52 to provide torque at wheel axles 56A, 56B.

The electric motor 16 is operatively connected to the transfer shaft 20 through a planetary gear set 60. The electric motor 16 is positioned axially between the planetary gear set 60 and the pairs of intermeshing gears 24, 30; 26, 32; and 28, 34. The electric motor 16 has an annular rotor 16A and an annular stator 16B that surrounds the rotor 16A and is grounded to a stationary member 70, such as a transmission casing. The stationary member 70 is referred to as stationary as it is not rotatable about the axis of rotation 23. The rotor 16A is concentric with and rotatable about the axis of rotation 23 and the transfer shaft 20. A motor controller (C) 72 controls the motor 16 to function as a motor by providing stored electric energy from an energy storage device (ESD) 74, such as a battery module, to windings of the stator 16B. Power electronics 76 provide electrical energy from the energy storage device 74 to the stator 16B in the form required by the stator 16B. For example, if the motor 16 uses alternating current, the power electronics 76 may be a power inverter (I) that converts direct current to alternating current required for three phase windings of the stator 16B, which alternating current is supplied along transfer conductors 78. In other embodiments, the power electronics 76 can condition the electrical energy to provide direct current to a motor requiring such.

The planetary gear set 60 includes a sun gear member 62, referred to as a second member. The sun gear member 62 is a sleeve gear, allowing the transfer shaft 20 to pass through a center annulus of the sun gear member 62. The planetary gear set 60 includes a carrier member 66, referred to herein as a first member, that rotatably supports pinion gears 65 that mesh with the sun gear member 62 and with a ring gear member 64. The carrier member 66 is connected to rotate commonly with the transfer shaft 20. As used herein, two components that "rotate commonly" or are "connected for common rotation" are physically connected so that they rotate at the same speed as one another. The ring gear member 64 is referred to as the third member of the planetary gear set 60. In other embodiments, the first, second and third members could be arranged differently. For example, in other embodiments, the first member could be the ring gear member, the second member could be the sun gear member, etc. The rotor 16A is connected by a rotor hub 67 to rotate commonly with the sun gear member 62.

The EMT 14 includes a plurality of selectively engageable torque-transmitting mechanisms 80, 82, 84 that are engaged alone or in different combinations to establish with the engine 12, the electric motor 16, or both, various operating modes between the input member 18 and the output member 52. A first clutch 80 can be referred to as an engine disconnect clutch as the engine 12 is disconnected from the EMT 14 when the first clutch 80 is not engaged. The first clutch 80 is selectively engageable to connect the input member 18 for common rotation with the carrier member 66. A second clutch 82 is selectively engageable to connect the ring gear member 64 for common rotation with the carrier member 66, so that a direct drive is established from the rotor 16A to the transfer shaft 20 through the planetary gear set 60. As understood by a person skilled in the art, when two members of a planetary gear set such as planetary gear set 60 are connected to rotate at the same speed, all three members rotate at the same speed. The second clutch 82 could instead be arranged to connect the ring gear member 64 for common rotation with the sun gear member 62, or to connect the sun gear member 62 for common rotation with the carrier member 66. Finally, a brake 84 is selectively engageable to ground the ring gear member 64 to the stationary member 70.

Although not shown for clarity in the drawings, the clutches 80, 82 and brake 84 are operatively connected to and controlled by the transmission controller 40. The clutches 80, 82 and brake 84 can be actuated by the transmission controller 40 hydraulically, such as by control of the flow of hydraulic fluid through a valve body (not shown) to engage one or more of the clutches 80, 82 or brake 84. Alternatively, the clutches 80, 82 and brake 84 can be electrically actuated under the control of the transmission controller 40, or actuated by any other suitable method under the control of the transmission controller 40.

The electric motor 16 can be used to launch a vehicle having the powertrain 10 in an electric launch mode. The clutch 80 is not engaged so that the engine 12 is disconnected from the EMT 14. In a first electric mode, the brake 84 is engaged so that the electric motor 16 provides torque to the transfer shaft 20 through the planetary gear set 60 at a ratio established by the planetary gear set 60. The synchronizer A is shifted to the left in FIG. 1. The electric motor 16 is controlled to be on, driving the transfer shaft 20 to provide torque at the output member 52 through intermeshing gears 24, 30. Alternatively, clutch 82 can be engaged instead of brake 84, so that the electric motor 16 provides torque at the transfer shaft 20 with a direct drive ratio through the planetary gear set 60.

The engine 12 alone can be used to launch a vehicle having the powertrain 10 when the clutch 80 is engaged. Still further, both the engine 12 and the electric motor 16 can be used to launch a vehicle having the powertrain 10 when both the clutches 80 and 82 are engaged, the synchronizer A is moved to the left in FIG. 1, and the electric motor 16 is controlled to be on.

Three different forward gear ratios can be established between the transfer shaft 20 and the countershaft 22 by engaging the synchronizer A with gear 30 in a first gear ratio, with gear 34 in a third gear ratio resulting in a higher speed of the countershaft 22, or by engaging synchronizer B with gear 32 in a second gear ratio resulting in a speed of the countershaft 22 between the speeds in the first gear ratio and the third gear ratio.

The electric motor 16 can be used to add torque to supplement engine torque, such as following a shift from one gear ratio to another gear ratio. Specifically, when the engine 12 is on and the clutch 80 is engaged, the electric motor 16 can also be controlled to be on from a speed of the output member 52 just after a shift of engagement of synchronizers occurs to a speed of the output member 52 greater than the predetermined speed at which the shift occurs if either the brake 84 is engaged or the clutch 82 is engaged. For example if the transmission controller TC 40 is programmed to shift synchronizer A from the left to a neutral position and shift synchronizer B to the left at a vehicle speed of approximately 50 kilometers per hour (kph) (and a corresponding, predetermined speed of the output member 52) to shift from the first gear ratio to the second gear ratio, the electric motor 16 can be on and adding torque at the transfer shaft 20 from some predetermined speed after the synchronizer B engages gear 32 to some predetermined speed greater than 50 kph.

A reverse gear ratio can be established between the input member 18 and the output member 52 by controlling the idler gear 48 to move into mesh with both the gear 42 and gear 44. The reverse gear ratio can be established whether the engine 12 or the motor 16 or both is providing driving torque. Alternatively, if the electric motor 16 is configured to function as a motor in two directions of rotation of the rotor 16A, then the electric motor 16 can provide a reverse speed ratio simply by controlling the electric motor to rotate in the reverse direction of rotation with torque transfer through intermeshing gears 24, 30 if synchronizer A is moved to the left. Because this latter electric-only reverse would be limited by the amount of electric energy stored in the energy storage device 74, an engine-driven reverse provided through the reverse gear set 42, 48, 44 may be most beneficial.

Figure 2:
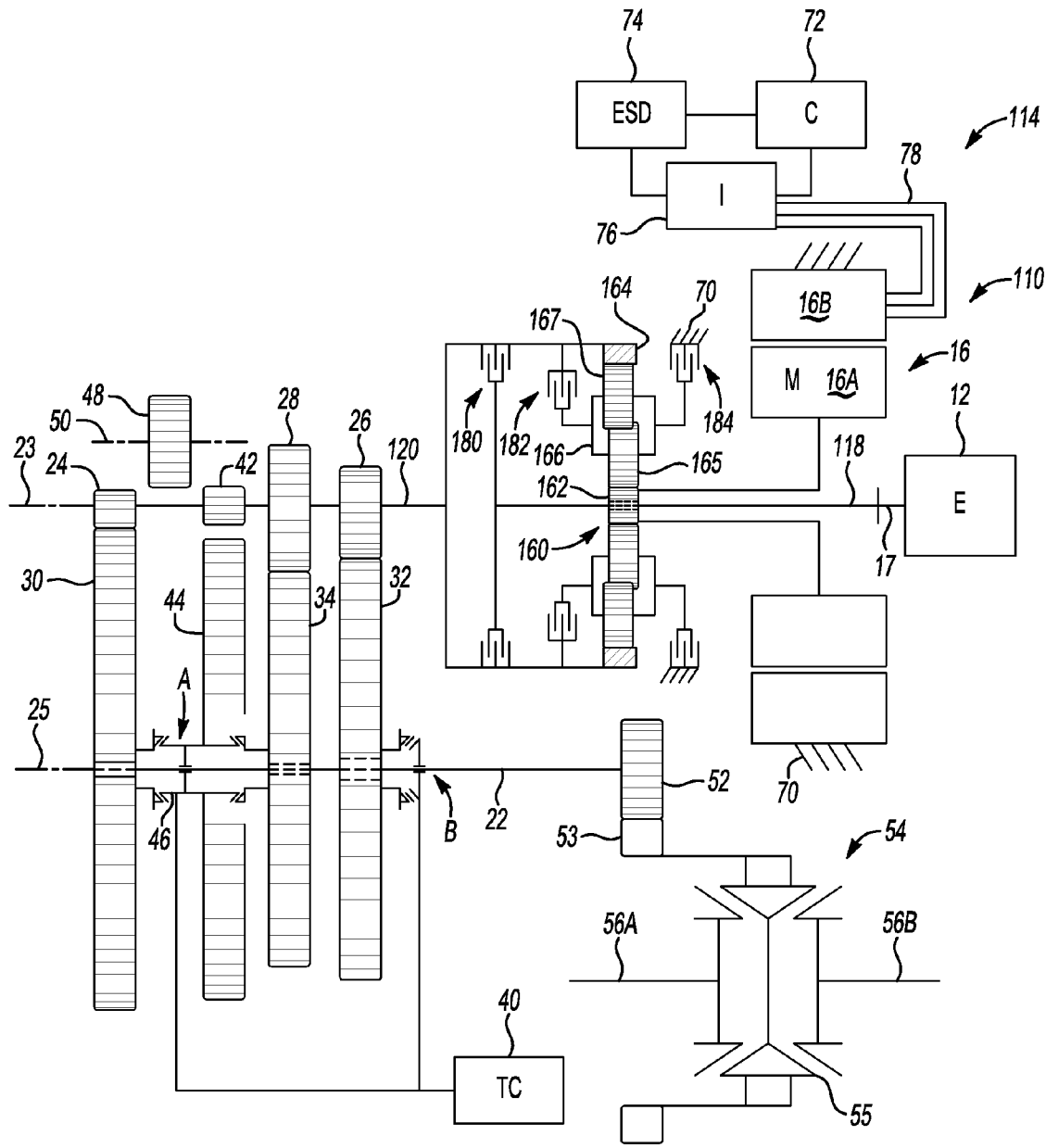
FIG. 2 is a schematic side view illustration of a second embodiment of a hybrid powertrain with a second embodiment on an EMT in accordance with an alternative aspect of the present teachings.

FIG. 2 is a schematic illustration of another embodiment of a powertrain 110 with an EMT 114. The EMT 114 has many of the same components as the EMT 14. Components of the EMT 114 that are identical to those described with respect to the EMT 14 are referred to with identical reference numbers and function as described with respect to the EMT 14 of FIG. 1. The EMT 114 includes a planetary gear set 160 that is a dual planetary-type gear set. The planetary gear set 160 includes a sun gear member 162 that is connected to rotate commonly with the rotor 16A. The sun gear member 162 is a sleeve, allowing the input member 118 to pass through the center of the sun gear member 162. The planetary gear set 160 includes a ring gear member 164 that rotates commonly with the input member 118 when a first clutch 180 is engaged. The planetary gear set 160 includes a carrier member 166 that rotatably supports a first set of pinion gears 165 that mesh with the sun gear member 162, and a second set of pinion gears 167 that mesh with the first set of pinion gears 165 and with the ring gear member 164. The ring gear member 164 is referred to as the first member of the planetary gear set 160, the sun gear member 162 is referred to as the second member of the planetary gear set 160, and the carrier member 166 is referred to as the third member of the planetary gear set 160.

In addition to the synchronizers A and B, the EMT 114 includes two clutches 180, 182 and a brake 184. The input member 118 is connected for common rotation with the ring gear member 64 and the transfer shaft 120 when the engine disconnect clutch 180 is engaged. The transfer shaft 120 is coaxial with the input member 118 and both rotate about the first axis of rotation 23. The second clutch 182 is selectively engageable to connect the ring gear member 164 for common rotation with the carrier member 166, providing a direct drive through the planetary gear set 160. The second clutch 182 could instead be arranged to connect the ring gear member 164 for common rotation with the sun gear member 162, or to connect the sun gear member 162 for common rotation with the carrier member 166. The brake 184 is selectively engageable to ground the carrier member 166 to the stationary member 70.

The same operating modes are available as described with respect to the powertrain of FIG. 1, with the clutch 180 engaged in the same modes as clutch 80, with the clutch 182 engaged in the same modes as clutch 82, and the brake 184 engaged in the same modes as brake 84 is engaged in for the EMT 14 of FIG. 1. Although not shown for clarity in the drawings, the clutches 180, 182 and brake 184 are operatively connected to and controlled by the transmission controller 40.

In comparison with the EMT 14, the planetary gear set 160 is positioned axially between the electric motor 16 and the sets of intermeshing gears 24, 30; 28, 34; and 26, 32. Because of this arrangement, an input member 118 is concentrically surrounded by the electric motor 16.

Figure 3:
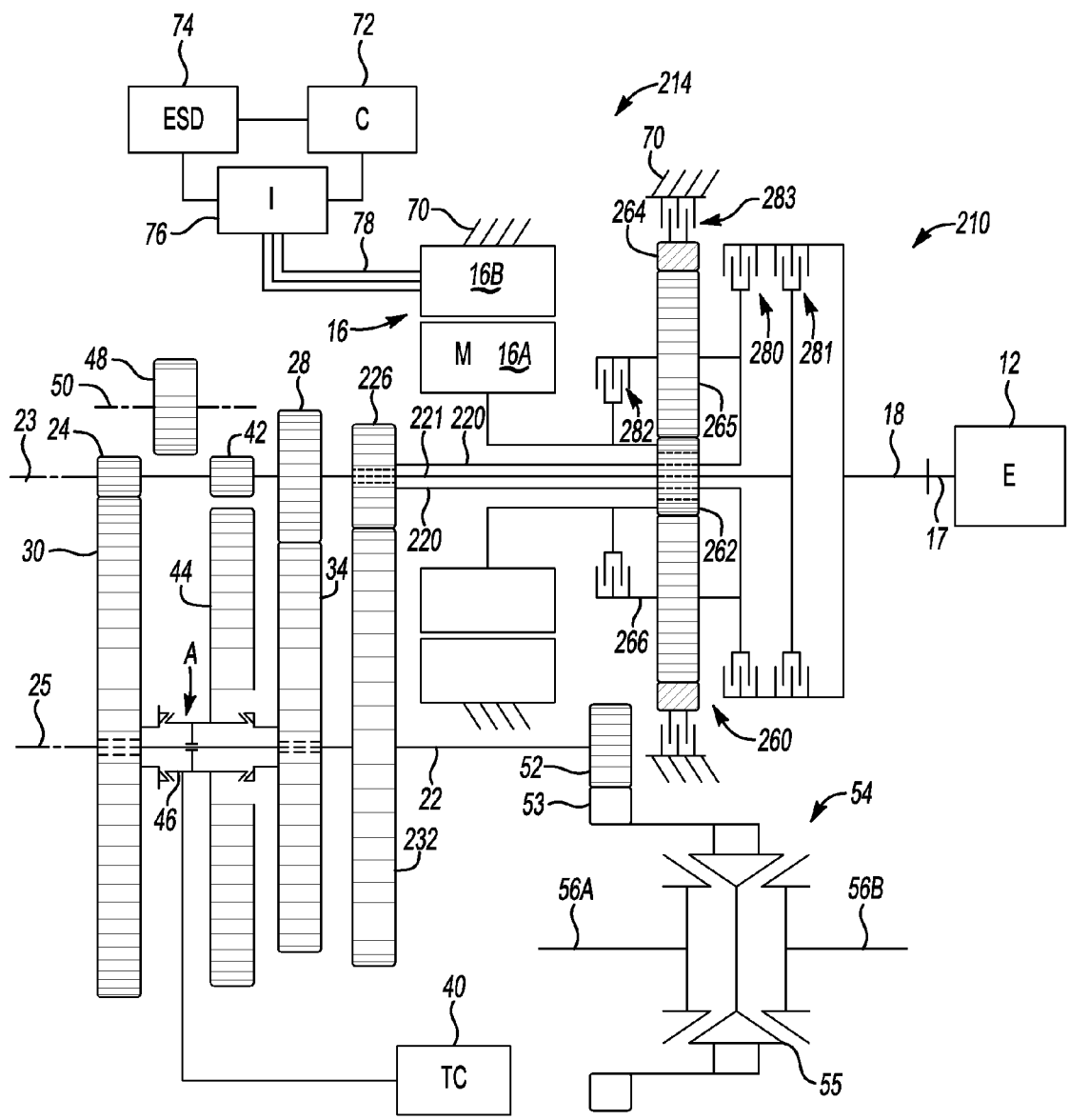
FIG. 3 is a schematic side view illustration of a third embodiment of a hybrid powertrain with a third embodiment on an EMT in accordance with an alternative aspect of the present teachings.

FIG. 3 is a schematic illustration of another embodiment of a powertrain 210 with an EMT 214. The EMT 214 has many of the same components as the EMT 14. Components that are identical to those as described with respect to EMT 14 are referred to with identical reference numbers and function as described with respect to the EMT 14 of FIG. 1.

A planetary gear set 260 similar to planetary gear set 60 of FIG. 1 is concentrically arranged about the axis of rotation 23. The planetary gear set 260 has a sun gear member 262 that is continuously connected for common rotation with the rotor 16A. The planetary gear set 260 has a ring gear member 264 and a carrier member 266. The carrier member 266 rotatably supports pinion gears 265. The pinion gears 265 mesh with both the sun gear member 262 and the ring gear member 264. The carrier member 266 is referred to herein as a first member of the planetary gear set 260. The sun gear member 262 is referred to herein as a second member of the planetary gear set 260. The ring gear member 264 is referred to herein as a third member of the planetary gear set 260.

The sun gear member 262 is configured as an annular sleeve so that a transfer shaft 220 and an inner shaft 221 can pass through a center annulus of the sun gear member 262. The inner shaft 221 can be referred to as a second transfer shaft. The transfer shaft 220 is a sleeve shaft and concentrically surrounds the inner shaft 221. Both the transfer shaft 220 and the inner shaft 221 rotate about the axis of rotation 23. Gear 226 is connected to the transfer shaft 220 to rotate at the same speed as the transfer shaft 220. Gear 226 meshes with gear 232 and establishes the second gear pair. Gear 226 is an annular sleeve, allowing inner shaft 221 to pass through a center opening in the gear 226. Gears 24, 28 and 42 are connected to rotate at the same speed as the inner shaft 221. The first pair of intermeshing gears 24, 30 provides a first numerical gear ratio between the inner shaft 221 and the countershaft 22. The second pair of intermeshing gears 226, 232 provides a second numerical gear ratio between the transfer shaft 220 and the countershaft 22. Gear 232 is continuously connected to rotate with the countershaft 22. Therefore, no synchronizer is required to engage the gear 232 to the countershaft 22. The third pair of intermeshing gears 28, 34 provides a third numerical gear ratio between the inner shaft 221 and the countershaft 22.

Figure 4:
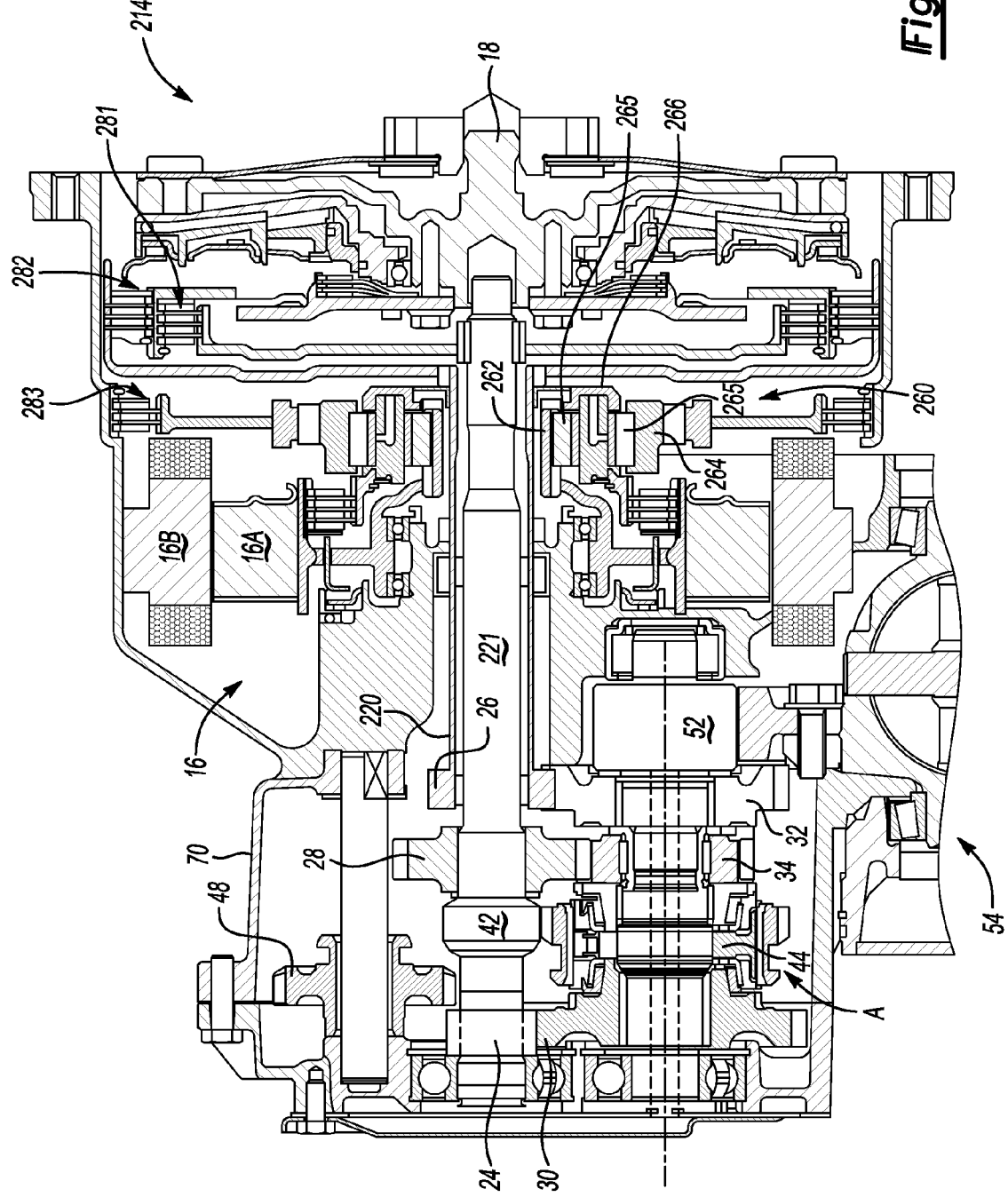
FIG. 4 is a cross-sectional view of one construction of the third embodiment of the hybrid powertrain of FIG. 3.

In addition to synchronizer A, several selectively engageable torque-transmitting mechanisms 280, 281, 282, 283 are provided in the EMT 214. A clutch 280 is provided that is selectively engageable to connect the input member 18 for common rotation with the carrier member 266 and the transfer shaft 220. The clutch 280 is referred to herein as an engine disconnect clutch or as a first clutch. A clutch 281 is provided that is selectively engageable to connect the input member 18 for common rotation with the inner shaft 221. A clutch 282 is provided that is selectively engageable to connect the carrier member 266 for common rotation with the sun gear member 262. The second clutch 282 could instead be arranged to connect the ring gear member 264 for common rotation with the sun gear member 262, or to connect the ring gear member 264 for common rotation with the carrier member 266. As used herein, the clutch 282 is referred to as a second clutch and the clutch 281 is referred to as a third clutch. A brake 283 is selectively engageable to ground the ring gear member 264 to the stationary member 70. Although not shown for clarity in the drawings, the clutches 280, 281, and 282 and brake 283 are operatively connected to and controlled by the transmission controller 40. FIG. 4 is a cross-sectional view of the transmission 214 with the same components as in the stick diagram view of FIG. 3.

The engine 12, the electric motor 16, the synchronizers A and B, and the torque-transmitting mechanisms 280, 281, 282, and 283 can be controlled to provide several different operating modes.

The EMT 214 can be launched in the first gear ratio by the engine 12 when the clutch 281 is engaged and the synchronizer A is shifted to the left in FIG. 3 to engage gear 30 with the transfer shaft 22. Alternatively, the engine 12 can be used to launch the vehicle having the powertrain 210 when the clutch 280 is engaged, transferring torque from the input member 18 to the transfer shaft 220 and through intermeshing gears 226, 232 to the countershaft 22.

Additionally, the electric motor 16 can also be on and adding additional torque at the output member 52 through the second set of intermeshing gears 226, 232 either in a low gear ratio if brake 283 is engaged, or in a direct drive through the planetary gear set 260 if the clutch 282 is engaged. Still further, the electric motor 16 could be used alone to launch the EMT 214 if brake 283 is engaged and neither of clutches 280 and 281 are engaged. In this case, the motor 16 drives the output member 52 through the second set of intermeshing gears 226, 232. If the electric motor 16 alone launches the EMT 214 in this manner, the engine 12 can then be "bump started", which is also referred to as a "flying start", by preselecting the synchronizer A to the right in FIG. 3 to engage gear 34 with the countershaft 22, and then engaging clutch 281, establishing the third gear ratio from the inner shaft 221 to the countershaft 22.

Figure 5:
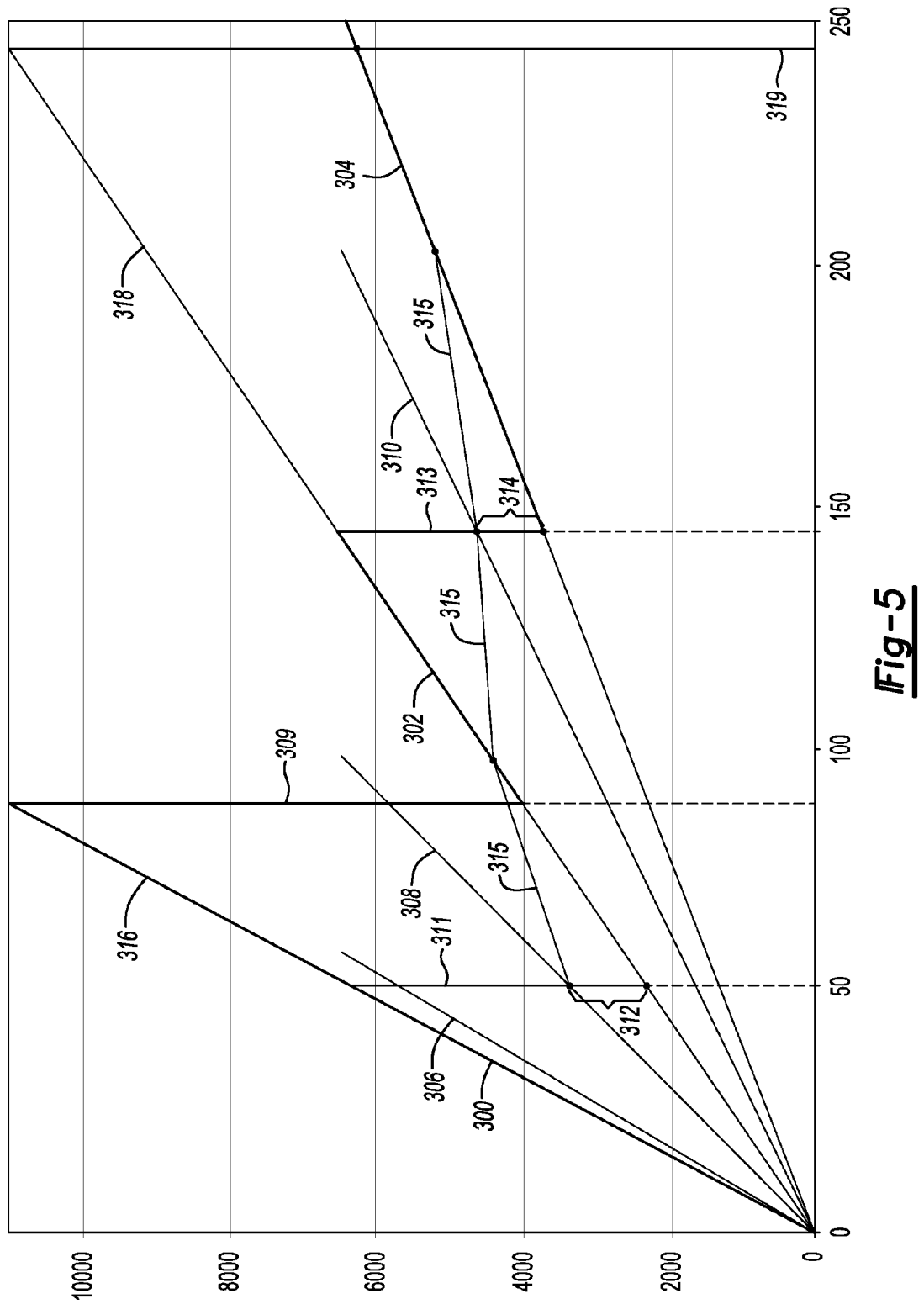
FIG. 5 is a chart of engine speed and motor speed in revolutions per minute (rpm) versus vehicle speed in kilometers per hour (kph) for the powertrain of FIGS. 3 and 4.

FIG. 5 is a chart of engine speed on the vertical axis in revolutions per minute (rpm) versus vehicle speed on the horizontal axis in kilometers per hour (kph). The vehicle speed is of an example vehicle on which the powertrain 210 is installed. Many of the available operating modes of the powertrain 210 are described herein with respect to the ranges of engine speed and vehicle speed over which they are established. Additionally, the chart of FIG. 5 illustrates the ability of the electric motor 16 to supplement engine torque during and following a gear ratio shift, eliminating some of the loss of mechanical advantage between shifts in the three-speed transmission 214 in comparison to a manual transmission having additional speed ratios available between those of the transmission 214.

In FIG. 5, line 300 indicates an example ratio of engine speed to vehicle speed when the powertrain 210 of FIGS. 3 and 4 is in a first gear ratio with clutch 281 engaged and the synchronizer A shifted to the left in FIG. 3 so that torque is transferred through the first set of intermeshing gears 24, 30. Line 302 indicates an example ratio of engine speed to vehicle speed when the powertrain 210 of FIGS. 3 and 4 is in a second gear ratio with clutch 280 engaged so that torque is transferred through the second set of intermeshing gears 226, 232. Line 304 indicates an example ratio of engine speed to vehicle speed when the powertrain 210 of FIGS. 3 and 4 is in a third gear ratio with clutch 281 engaged and the synchronizer A shifted to the right in FIG. 3 so that torque is transferred through the third set of intermeshing gears 28, 34. Line 306 indicates an example ratio of engine speed to vehicle speed when the powertrain 210 of FIGS. 3 and 4 is in a reverse gear ratio with clutch 281 engaged, the idler gear 48 moved into meshing engagement with the gears 42, 44, and the synchronizer A in a neutral position in FIG. 3 so that torque is transferred through the reverse set of intermeshing gears 42, 48, 44.

In FIG. 5, lines 308 and 310 indicate additional ratios of engine speed to vehicle speed not available in the three-speed EMT 214 of FIGS. 3 and 4 but that would be available in a typical conventional transmission having two additional forward speed ratios. For example, a conventional manual transmission may have five available ratios of engine speed to vehicle speed, 300, 308, 302, 310, 304, associated with five fixed gear ratios, in which case the second ratio 302 of the EMT 214 would be the third ratio of the conventional transmission, and the third ratio 304 of the EMT 214 would be the fifth ratio of the conventional transmission. As is evident in FIG. 5, there is a loss in mechanical advantage 312 in a shift along shift line 311 at a vehicle speed of approximately 50 kph from ratio 300 to ratio 302 in the EVT 214 in comparison to a shift from ratio 300 to ratio 308 in the conventional manual transmission. Similarly, there is a loss in mechanical advantage 314 in a shift along shift line 313 at a vehicle speed of about 145 kph from ratio 302 to ratio 304 in the EVT 214 in comparison to a shift from speed ratio 302 to speed ratio 310 in the conventional manual transmission.

The EMT 214 has the advantage of being able to use torque assistance provided by the electric motor 16 to help reduce the loss in mechanical advantage associated with fewer fixed gears ratios and wider ratios steps between gear ratios. For example, the electric motor 16 can be controlled to be on at a speed prior to the vehicle speed of 50 kph (the vehicle speed associated with a predetermined speed of the output member 52 at which the shift occurs from the first gear ratio 300 to the second gear ratio 302). The brake 283 is engaged so that torque multiplication is provided through the planetary gear set 260 from the electric motor 16 to the transfer shaft 220. When vehicle speed reaches approximately 50 kph, at the shift line 311, clutch 281 is disengaged and clutch 280 is engaged. The synchronizer A can be moved to its neutral position. The electric motor 16 is kept on during the shift and to a higher vehicle speed (corresponding with line 309) beyond the shift line 311 to supplement engine torque, thereby substantially substituting for the lost mechanical advantage 312 between second gear of a conventional manual transmission (line 308) and second gear (line 302) of the EMT 214. This may be referred to as "filling in" torque with the electric motor 16, or using the electric motor 16 for "torque fill-in". Line 315 indicates the post-shift engine speed as affected by operation of the motor 16.

Figure 6:
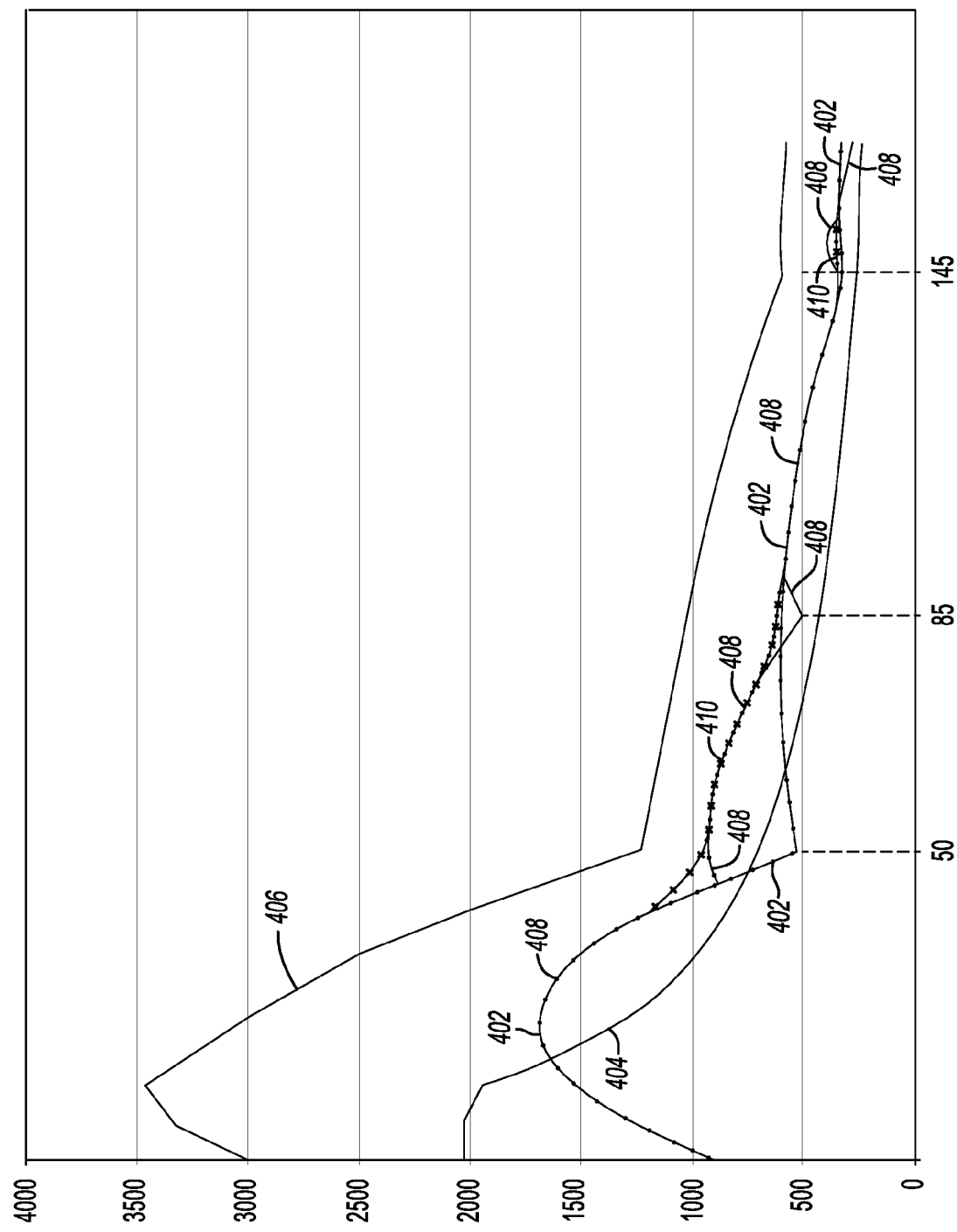
FIG. 6 is a chart of torque in Newton-meters (N-m) of various components of the powertrain of FIGS. 3 and 4 at different vehicle speeds in kph.

FIG. 6 is a plot of torque in Newton-meters (N-m) versus vehicle speed in kph for a vehicle with the powertrain 210 controlled to shift according to the chart of FIG. 5. Curve 402 indicates the torque at the output member 52 provided by the engine 12. Curve 404 indicates torque that can be provided at the output member 52 by the electric motor 16 in an electric-only operating mode with brake 283 engaged and the engine 12 off. Curve 406 illustrates the maximum torque that can be provided at the output member 52 if both the engine 12 and the electric motor 16 are on over a large range of vehicle speeds. The torque provided by the same engine 12 in a conventional manual transmission having the five gear ratios indicated in FIG. 5 is shown as curve 408, and follows large parts of curve 402. As indicated by section 410, the electric motor 16 is controlled to be on over a range of vehicle speeds (and associated speeds of the output member 52) prior to and after each of the predetermined speeds at which gear shifts occur in the EMT 214. This enables the electric motor 16 to add torque when engine torque alone would be less than the torque that would be provided by the engine 12 through a conventional manual transmission having the additional gear ratios indicated in FIG. 5. As is apparent in FIG. 5, the predetermined vehicle speeds at which shifts occur in the EMT 214 correspond with engine speeds of approximately 6500 rpm, which may be a predetermined maximum engine speed. A predetermined speed of the output member 52 corresponds with the predetermined maximum engine speeds by a formula dependent on the gear tooth counts of the planetary gear set 260, the gear ratios of the sets of intermeshing gears, and tire size.

Referring again to FIG. 5, the electric motor 16 can operate at higher speeds than the engine 12. The use of the electric motor 16 to add torque assistance over a range of vehicle speeds around a gear ratio shift in the EMT 214 is also indicated by line 316 which indicates the speed of the rotor 16A of the electric motor 16. At a vehicle speed of around 85 kph, the electric motor 16 reaches a rated speed limit in the high-ratio mode (i.e., the operating speed of the electric motor 16 when the brake 283 is engaged), and the brake 283 is then disengaged so that the motor 16 is disconnected from the powerflow in the EMT 214 and can freely spin to a lower speed as indicated by line 309. Alternatively, the electric motor 16 may be kept on and the clutch 282 engaged so that the electric motor 16 can operate at a lower speed with direct drive through the planetary gear set 260. In the latter case, as the brake 283 is disengaged, the electric motor 16 can be controlled to briefly function as a generator to slow the rotor 16A to the new target speed associated with engagement of clutch 282, rather than absorbing energy in the clutch 282. In the direct drive mode, the electric motor 16 may still be used to supplement engine torque up to the rated maximum speed of the motor 16 (e.g., approximately 11,000 rpm, as indicated in FIG. 5), which will not be reached in the direct drive mode until well beyond the maximum anticipated vehicle speed.

At about 145 kph, the engine 12 again reaches its predetermined rated speed and is shifted along shift line 313 into the third gear ratio by disengaging clutch 280, engaging clutch 281, and shifting the synchronizer A to the right in FIG. 3. The electric motor 16 can be controlled to be on from some vehicle speed prior to the shift line 313, such as a vehicle speed of 130 kph, to a vehicle speed beyond the shift line 313 to supplement engine torque and simulate the missing ratio associated with line 310 that would be available in a conventional manual transmission. The electric motor 16 could remain on to supplement engine torque up to a predetermined maximum vehicle speed, if desired or until the motor reaches its predetermined maximum speed, indicated as occurring at a vehicle speed corresponding with line 319 in FIG. 5. The use of the electric motor 16 to add torque assistance at vehicle speeds around a gear ratio shift from second to third gear in the EMT 214 is indicated by line 318 which indicates the speed of the rotor 16A of the electric motor 16. An area 410 in FIG. 6 around the vehicle speed 145 kph also indicates the supplemental torque added by the electric motor 16.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A transmission comprising:
   an input member;
   an output member;
   at least one shaft; wherein the input member and said at least one shaft are rotatable about a first axis of rotation;
   a countershaft arranged substantially parallel with said at least one shaft and rotatable about a second axis of rotation; wherein the output member is operatively connected to rotate with the countershaft;
   multiple pairs of intermeshing gears; wherein each of the pairs of intermeshing gears is operable to provide a different gear ratio between said at least one shaft and the countershaft;
   a plurality of selectively engageable torque-transmitting mechanisms; wherein at least some of the pairs of intermeshing gears require engagement of a respective one of the torque-transmitting mechanisms with a respective one of the pairs of intermeshing gears to transfer torque to the countershaft;
   a transmission controller operable to control engagement of the torque-transmitting mechanisms to selectively establish at least some of the gear ratios;
   an electric motor concentric with the first axis of rotation;
   a planetary gear set concentric with the first axis of rotation; wherein the planetary gear set has a first member, a second member and a third member;
   a first clutch selectively engageable to operatively connect the input member with the first member;
   wherein the first member is operatively connectable with the countershaft through at least one of the pairs of intermeshing gears and the second member is connected to rotate commonly with the electric motor, the electric motor being operable to add torque to and receive torque from the second member;
   wherein said at least one shaft includes a transfer shaft connected to rotate commonly with the first member and an inner shaft concentric with the transfer shaft; wherein the transfer shaft is a sleeve shaft; wherein at least one of said multiple pairs of intermeshing gears is operatively connected with the inner shaft and at least one other of said multiple pairs of intermeshing gears is operatively connected with the transfer shaft;
   a second clutch selectively engageable to connect one of the members of the planetary gear set with another of the members of the planetary gear set to establish a direct drive from the electric motor to the transfer shaft during which the electric motor rotates commonly with the transfer shaft;
   a third clutch selectively engageable to connect the input member to rotate commonly with the inner shaft even when the second clutch is not engaged; and wherein the third clutch is disengaged when the second clutch is engaged to establish the direct drive.

2. The transmission of claim 1 in combination with an engine operatively connected to the input member, wherein the electric motor is controlled to be on to add torque at the transfer shaft when the engine launches the vehicle and both of the first and the second clutches are engaged.

3. The transmission of claim 1, further comprising:
   a brake selectively engageable to prevent rotation of the third member of the planetary gear set; and wherein the electric motor is operable to launch the transmission through the planetary gear set when the brake is engaged.

4. The transmission of claim 1, in combination with an engine operatively connected to the input member; wherein the torque-transmitting mechanisms are synchronizers; and further comprising:
   a brake selectively engageable to prevent rotation of the third member of the planetary gear set;
   wherein the transmission is launched by the electric motor when the brake is engaged; and
   wherein the engine is started after the transmission is launched by the electric motor by preselecting one of the synchronizers to engage a gear of one of the multiple pairs of intermeshing gears operatively connected to the inner shaft with the countershaft and engaging said another clutch while the brake remains engaged.

5. The transmission of claim 1, wherein the electric motor is positioned axially between the planetary gear set and the multiple pairs of intermeshing gears.

6. The transmission of claim 1, in combination with an engine operatively connected to the input member; wherein the transmission is launched by the engine when the first clutch is engaged.

7. The transmission of claim 1, further comprising:
   a brake selectively engageable to prevent rotation of the third member of the planetary gear set; and
   wherein the electric motor is controlled to drive the transfer shaft in a first mode through the planetary gear set when the brake is engaged and in a second mode when the second clutch is engaged.

8. The transmission of claim 7, in combination with an engine operatively connected to the input member;
   wherein the transmission is launched by the electric motor when one of the brake and the second clutch is engaged; and
   wherein the engine is started after the transmission is launched by the electric motor by engaging the third clutch while said one of the brake and the second clutch remains engaged.

9. The transmission of claim 8 in combination with the engine, wherein the brake is disengaged and the second clutch is engaged after the engine is started.

10. The transmission of claim 1, wherein the electric motor is controlled to be on from a speed of the output member less than a predetermined speed at which a shift of engagement of torque-transmitting mechanisms occurs to a speed of the output member greater than the predetermined speed.

11. The transmission of claim 1, further comprising:
   a first gear mounted to rotate about the first axis of rotation and configured to receive torque from the input member;
   a second gear mounted to rotate with one of the synchronizers on the countershaft and axially aligned with but not meshing with the first gear; and
   an idler gear axially movable to mesh with both the first gear and the second gear to transfer torque to the countershaft at a reverse speed ratio between the input member and the output member.

12. A transmission comprising:
   an input member;
   an output member;
   a transfer shaft configured as a sleeve shaft;
   an inner shaft concentric with and surrounded by the transfer shaft; wherein the input member, the transfer shaft and the inner shaft are rotatable about a first axis of rotation;
   a countershaft arranged substantially parallel with the transfer shaft and rotatable about a second axis of rotation; wherein the output member is operatively connected to rotate with the countershaft;
   a plurality of selectively engageable synchronizers;
   at least three pairs of intermeshing gears operable to transfer torque to the countershaft; wherein one of the pairs of intermeshing gears is operable to establish a first gear ratio from the inner shaft to the countershaft when one of the synchronizers is engaged, and another one of the pairs of intermeshing gears provides a different gear ratio between the transfer shaft and the countershaft;
   a transmission controller operable to control engagement of the synchronizers;
   an electric motor concentric with the first axis of rotation;
   a planetary gear set concentric with the first axis of rotation and having a first member connected for common rotation with the transfer shaft, a second member connected for common rotation with the electric motor, and a third member;
   a first clutch selectively engageable to connect the input member with the first member of the planetary gear set;
   a second clutch selectively engageable to connect one of the members of the planetary gear set to rotate commonly with another one of the members of the planetary gear set to provide a direct drive ratio from the electric motor to the transfer shaft through the planetary gear set during which the electric motor rotates commonly with the transfer shaft;
   a third clutch selectively engageable to connect the input member for common rotation with the inner shaft even when the second clutch is not engaged; and
   a brake selectively engageable to hold the third member stationary.

13. The transmission of claim 12, wherein the transmission is launched by the electric motor when the brake is engaged.

14. The transmission of claim 12, wherein the electric motor is controlled to be on from a speed of the output member less than a predetermined speed at which a shift between the gear ratios occurs to a speed of the output member greater than the predetermined speed.

15. The transmission of claim 12, further comprising:
   a first gear mounted to rotate with the inner shaft;
   a second gear mounted to rotate with one of the synchronizers on the countershaft and axially aligned with but not meshing with the first gear; and
   an idler gear axially movable to mesh with both the first gear and the second gear to transfer torque to the countershaft at a reverse speed ratio between the input member and the output member.

* * * * *